F. SHARP.

CAN OPENER.

No. 10,443. Reissued Jan. 29, 1884.

Attest.
S. S. Carpenter,
M. Layman.

Inventor.
Frank Sharp
by James H. Layman
Atty.

UNITED STATES PATENT OFFICE.

FRANK SHARP, OF LOS ANGELES, CALIFORNIA.

CAN-OPENER.

SPECIFICATION forming part of Reissued Letters Patent No. 10,443, dated January 29, 1884.

Original No. 253,432, dated February 7, 1882. Application for reissue filed December 1, 1883.

*To all whom it may concern:*

Be it known that I, FRANK SHARP, a citizen of the United States, residing at Los Angeles, in the county of Los Angeles, State of California, but formerly a resident of Socorro, in the Territory of New Mexico, have invented certain new and useful Improvements in Can-Openers, of which the following is a specification, reference being had to the annexed drawings.

The object of my invention is to provide an implement wherewith ordinary sheet-metal cans or boxes are capable of being cut open in the most expeditious and convenient manner. Said implement consists of a suitable handle, from which projects a bar terminating with a point, adapted to penetrate the can and to serve as a pivot or fulcrum for the opener. Journaled in this handle and in a lug of the bar, and arranged parallel with the latter, is a screw that engages with the shank of the knife or cutter, said shank being slotted so as to allow the cutter to travel freely along said bar. By this arrangement the proper turning of said screw will cause the cutter either to advance or retract, as may be necessary, and will hold said cutter to any desired adjustment without the employment of set-screws or other special retaining devices, as hereinafter more fully described.

Another feature of my invention consists in making the knife with two cutting-edges terminating with an arrow-shaped point, that readily pierces the can or box to be opened. By this construction the shoulders of the arrow-point serve as bearings, which run under the sheet to be severed and slightly in advance of the cutting-edges, thereby maintaining the knife in the most effective position and preventing it slipping out of the can or box. Furthermore, the sides of this knife are so concaved or rounded as to turn down the edges of the slot cut in the can, by which arrangement the top of the latter is left perfectly smooth, as hereinafter more fully described.

Figure 1:
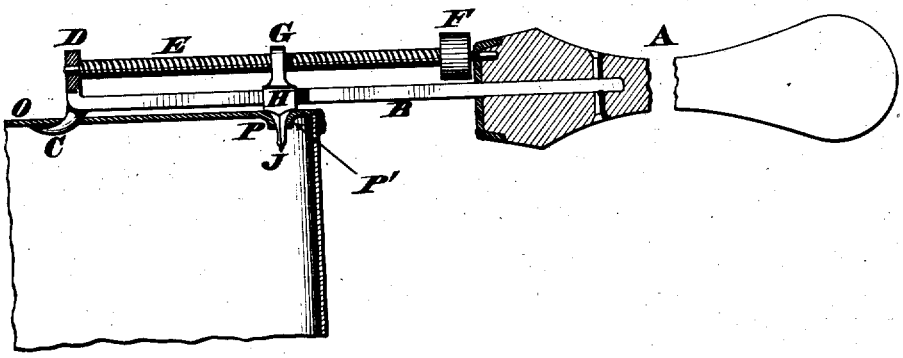
Figure 2:
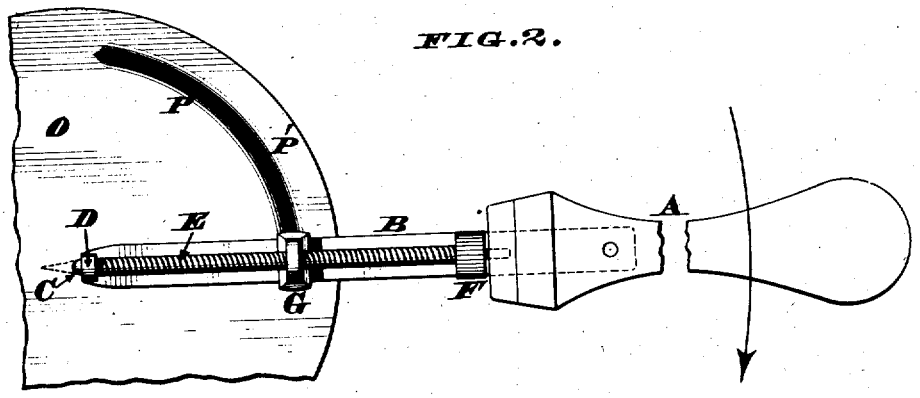
Figure 4:
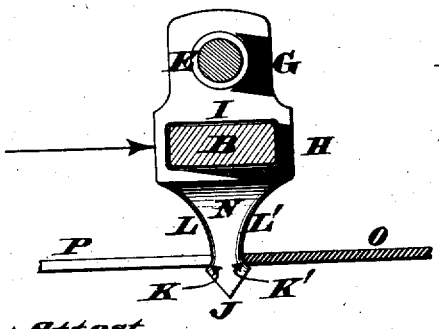
Figure 5:
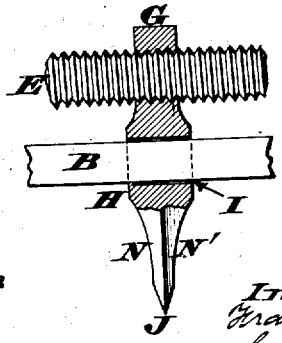
Figure 3:
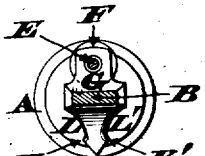

In the annexed drawings, Figure 1 is a sectionized elevation, showing my implement in the act of cutting open the head of a can, part of the handle of said implement being broken away. Fig. 2 is a plan thereof. Fig. 3 is a transverse section of the implement taken in the plane of the cutter. Fig. 4 is a similar section, but taken on an enlarged scale, and showing one of the shoulders of the cutter engaged beneath the head of the can or box. Fig. 5 is an enlarged section of the cutter taken in the plane of the adjusting-screw.

A represents a suitable handle, from which projects a bar, B, having at its outer end a point, C, and an upwardly-projecting lug, D, which lug is pierced to afford a journal-bearing for one end of a screw, E, the opposite end of said screw being journaled in the handle of the implement. This screw is readily turned either to the right or left by means of a thumb-wheel, F, attached thereto. Furthermore, this screw engages with a female thread in the shank G of cutter H, as more clearly seen in Fig. 5, said shank being slotted at I, to enable said cutter to travel freely along the bar B. This knife H has an arrow-shaped point, J, the shoulders of which, K K′, merge into the cutting-edges L L′, as more clearly seen in Fig. 4. Of these edges the one L′ may be designated as the "front cutter," and the other edge L as the "back cutter." The sides of this cutter are rounded inwardly or concaved, as shown at N N′ in Fig. 5.

O represents the top or head of a box or can to be opened.

The method of using my implement is as follows: The point C is first thrust into the can-top at or near the center of the same, and the knife H is adjusted so as to cause it to cut comparatively close to the rim of the can, the screw E enabling said knife to be readily advanced or retracted, so as to bring the latter into the desired position. A slight pressure on handle A forces the knife H J L L′ down through the can-top O, the point C now serving as a fulcrum, that facilitates this operation, after which act said point becomes a pivot, that enables said handle to be swung around in the direction indicated by the arrow in Fig. 2. When thus swung around, the knife-edge L cuts a concentric slot or slit in the can-top, the concave sides N N′ of said cutter or knife causing the opposite edges P P′ of the slot to bend down into the can, as represented in Fig. 1. It will thus be seen that the top of the can will be perfectly smooth after being cut open. Reference to Fig. 4 shows that as the knife advances in the direction of the arrow the shoulder K′ engages under the can-top O, and thereby holds the latter in contact with the cutting-edge L′. Hence it is apparent that said shoulder serves as a bearing or stop to prevent the cutter accidentally slipping up out of the slot while the latter is being made in the can-top. In case the handle should be swung around in a reverse manner to what is indicated in Fig. 2, the other shoulder, K, and edge L will then operate, as just described.

I claim as my invention—

1. The combination, with a can-opener of the class specified, of a screw that engages with and passes through the female-threaded shank of the cutter, whereby said screw serves not only to advance and retract said cutter, but to hold the latter to any desired adjustment without employing a special retaining device, substantially as herein described.

2. A can-opener constructed substantially as herein shown and described, consisting of the handle A, the bar B, having a curved point, C, and a perforated lug, D, upon its forward end, the swiveled screw E, having thumb-wheel F upon its inner end, and the cutter H, having in its shank G a screw-hole to receive the screw E and a perforation to receive the bar B, as set forth.

3. A can-opener knife having an arrow-shaped point, J, whose shoulders K K′ merge into the cutting-edges L L′ at the front and rear of said knife, respectively, as and for the purpose specified.

4. A can-opener knife whose sides N N′ are rounded or concaved for the purpose of bending inwardly the opposite edges of the slit made in the vessel, as at P, P′, herein described.

In testimony whereof I affix my signature in presence of two witnesses.

FRANK SHARP.

Witnesses:
H. C. GRAHAM,
N. J. CLARKE.